United States Patent
Schmalzrieth et al.

(10) Patent No.: US 10,166,933 B2
(45) Date of Patent: Jan. 1, 2019

(54) FASTENING ARRANGEMENT FOR SECURING A UNIT MOUNT AND A STABILIZER MOUNT

(71) Applicant: AUDI AG, Ingolstadt (DE)

(72) Inventors: Sven Schmalzrieth, Manching (DE); Vladimir Idelevitch, Nürnberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/296,753

(22) Filed: Oct. 18, 2016

(65) Prior Publication Data

US 2017/0113625 A1  Apr. 27, 2017

(30) Foreign Application Priority Data

Oct. 24, 2015  (DE) .................. 10 2015 013 780

(51) Int. Cl.
| | |
|---|---|
| *B60R 1/00* | (2006.01) |
| *B60R 11/00* | (2006.01) |
| *B60G 21/055* | (2006.01) |

(52) U.S. Cl.
CPC .......... *B60R 11/00* (2013.01); *B60G 21/0551* (2013.01); *B60R 2011/0042* (2013.01)

(58) Field of Classification Search
CPC . B60R 11/00; B60R 2011/0042; B60R 11/02; B60R 11/0211; B60R 11/0235; B60R 11/0258; B60R 11/04; B60G 21/0551; F16M 11/06; F16M 11/2007; F16M 13/02
USPC ........ 248/214, 222.14, 584, 72; 280/124.14; 224/403, 515, 519, 521
See application file for complete search history.

(56) References Cited

U.S. PATENT DOCUMENTS

| | | | | |
|---|---|---|---|---|
| 515,622 | A * | 2/1894 | Steen | B60R 11/00 224/440 |
| 5,992,885 | A * | 11/1999 | Fukagawa | B60G 3/202 280/830 |
| 6,687,947 | B2 * | 2/2004 | Sato | B60S 1/0427 15/250.3 |
| 2004/0222614 | A1 * | 11/2004 | Lindenman | B60D 1/06 280/455.1 |
| 2004/0245416 | A1 * | 12/2004 | Attee | B25B 5/147 248/214 |
| 2007/0187447 | A1 * | 8/2007 | Hamann | A01K 97/08 224/519 |
| 2007/0295874 | A1 * | 12/2007 | Hollenhead | B60R 11/02 248/289.11 |
| 2008/0067727 | A1 * | 3/2008 | Schwarz | B60G 21/0551 267/141.1 |

(Continued)

FOREIGN PATENT DOCUMENTS

| | | |
|---|---|---|
| DE | 32 09 606 C1 | 7/1983 |
| DE | 10 2006 011 782 A1 | 4/2007 |

(Continued)

*Primary Examiner* — Muhammad Ijaz
(74) *Attorney, Agent, or Firm* — Henry M. Feiereisen LLC

(57) ABSTRACT

A fastening arrangement for securing a unit mount and a stabilizer mount to a vehicle component of a motor vehicle includes a bearing seat, which is provided on a side of the vehicle component, and a fastening element, which is adapted for detachable connection to the vehicle component and supporting the stabilizer mount, with the unit mount being arranged between the bearing seat and the fastening element.

20 Claims, 1 Drawing Sheet

(56) References Cited

U.S. PATENT DOCUMENTS

| | | | | |
|---|---|---|---|---|
| 2008/0100016 A1* | 5/2008 | Parisi | B60G 21/0551 | 280/124.13 |
| 2013/0026745 A1* | 1/2013 | Hill | B62D 49/04 | 280/781 |
| 2013/0099070 A1* | 4/2013 | Chirpich | F16L 3/1075 | 248/73 |
| 2013/0105639 A1* | 5/2013 | Chirpich | F16L 3/137 | 248/73 |
| 2014/0117176 A1* | 5/2014 | Pierce | F16M 13/02 | 248/205.1 |
| 2015/0097351 A1* | 4/2015 | Rosepiler | B60G 21/0551 | 280/124.152 |
| 2015/0129342 A1* | 5/2015 | O'Rourke | B62J 17/04 | 180/219 |
| 2015/0328970 A1* | 11/2015 | Bourlon | B60G 21/0551 | 180/291 |
| 2016/0114778 A1* | 4/2016 | Pierce | F16M 13/02 | 248/214 |

FOREIGN PATENT DOCUMENTS

| | | |
|---|---|---|
| DE | 10 2009 020 107 A1 | 11/2010 |
| WO | WO 03/061996 A1 | 7/2003 |

* cited by examiner

FASTENING ARRANGEMENT FOR SECURING A UNIT MOUNT AND A STABILIZER MOUNT

CROSS-REFERENCES TO RELATED APPLICATIONS

This application claims the priority of German Patent Application, Serial No. 10 2015 013 780.8, filed Oct. 24, 2015, pursuant to 35 U.S.C. 119(a)-(d), the disclosure of which is incorporated herein by reference in its entirety as if fully set forth herein.

BACKGROUND OF THE INVENTION

The present invention relates to a fastening arrangement for securing a unit mount and a stabilizer mount to a vehicle component of a motor vehicle.

It would be desirable and advantageous to provide an improved fastening arrangement to obviate prior art shortcomings and to exhibit a compact construction while yet being reliable in operation.

SUMMARY OF THE INVENTION

According to one aspect of the present invention, a fastening arrangement for securing a unit mount and a stabilizer mount to a vehicle component of a motor vehicle includes a bearing seat provided on a side of the vehicle component, and a fastening element adapted for detachable connection to the vehicle component and supporting the stabilizer mount, with the unit mount being arranged between the bearing seat and the fastening element.

The present invention resolves prior art shortcomings by arranging the unit mount between the bearing seat and the fastening element, with the stabilizer mount being supported upon the fastening element. The fastening element is thus conceived to secure the unit mount and at the same time to support the stabilizer mount to thereby establish a sandwich-like disposition of unit mount, fastening element, and stabilizer mount and attachment of the unit mount and the stabilizer mount with little space demands. A further advantage involves the functional integration achieved by the fastening element, namely securement of the unit mount and presence of a fastening portion for the stabilizer mount, thereby eliminating the need to modify the vehicle component through formation of a respective fastening portion.

According to another advantageous feature of the present invention, the bearing seat can be configured in the form of a recess formed in the vehicle component and replicating an outer contour of the unit mount. As a result, a particularly lightweight construction of the bearing seat and thus of the fastening arrangement is ensured.

According to another advantageous feature of the present invention, the bearing seat may also be configured, as an alternative, in the form of a bearing shell formed in the vehicle component and also shaped to conform to the outer contour of the unit mount. The configuration of the bearing seat in the form of a bearing shell has the advantage that the vehicle component does not become weakened by the presence of the bearing seat.

Depending on the configuration of the unit mount, the recess in the vehicle component or the formed bearing shell may be round, oval, or also polygonal.

According to another advantageous feature of the present invention, the bearing seat has a side in confronting relationship to the unit mount, with the side being shaped in the form of a clamp. In this region, the fastening element has thus a configuration which conforms to the outer contour of the unit mount to thereby ensure that the unit mount is held captive.

According to another advantageous feature of the present invention, the fastening element has a side in confronting relationship to the stabilizer mount, with the side having a shaped portion to conform to an outer contour of a portion of the stabilizer mount. In this region, the fastening element has thus a configuration which conforms to the outer contour of the elastomer of the stabilizer mount. The stabilizer is thus securely held and in addition an installation aid for precisely fitting the stabilizer mount is provided in a simple manner.

According to another advantageous feature of the present invention, the shaped portion can have a surface area with grooves. In this way, inadvertent turning of the elastomer of the stabilizer mount is prevented.

According to another advantageous feature of the present invention, the fastening element can be made of a metal alloy or fiber composite, such as fiber-reinforced plastic.

According to another advantageous feature of the present invention, a screw fastener may be provided to detachably connect the fastening element to a bracket of the vehicle component. As a result, installation can be realized in a simple and rapid manner. The bracket and the fastening element may, of course, also be configured such as to enable a securement of the stabilizer mount with the same screw connection.

According to another aspect of the present invention, a motor vehicle includes a vehicle component, a unit mount, a stabilizer mount, and a fastening arrangement configured to secure the unit mount and the stabilizer mount to the vehicle component, the fastening arrangement including a bearing seat provided on a side of the vehicle component, and a fastening element adapted for detachable connection to the vehicle component and supporting the stabilizer mount, with the unit mount being arranged between the bearing seat and the fastening element.

According to another advantageous feature of the present invention, the vehicle component can include a bracket, with the fastening arrangement including a screw fastener to detachably connect the fastening element to the bracket, and with the bracket and the vehicle component forming a single-piece construction or unitary structure. As an alternative, the bracket may also involve a separate component which can be connected to the vehicle component by interference fit and/or form fit and/or material joint.

According to another advantageous feature of the present invention, the vehicle component may represent a subframe of the motor vehicle.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
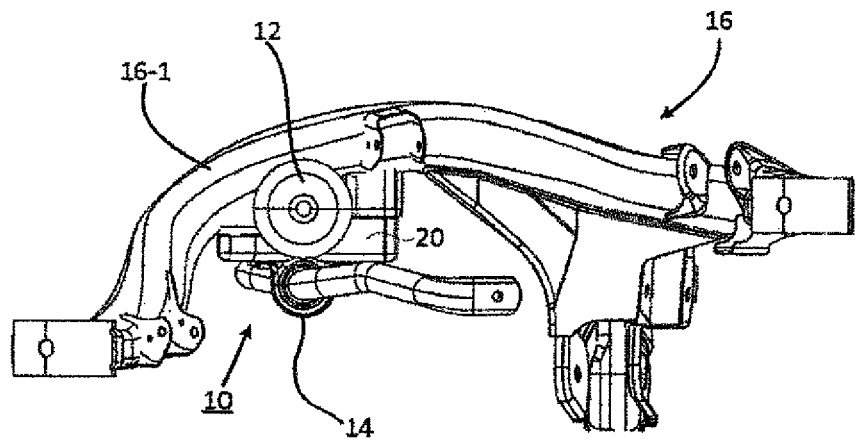
FIG. 1 is a three-dimensional illustration of a fastening arrangement according to the present invention for the securement of a unit mount and a stabilizer mount.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a three-dimensional illustration of a fastening arrangement according to the present invention, generally designated by reference numeral 10, for the securement of a unit mount 12 and a stabilizer mount 14 to a vehicle component 16. The vehicle component 16 may hereby involve a subframe of the motor vehicle.

Figure 2:
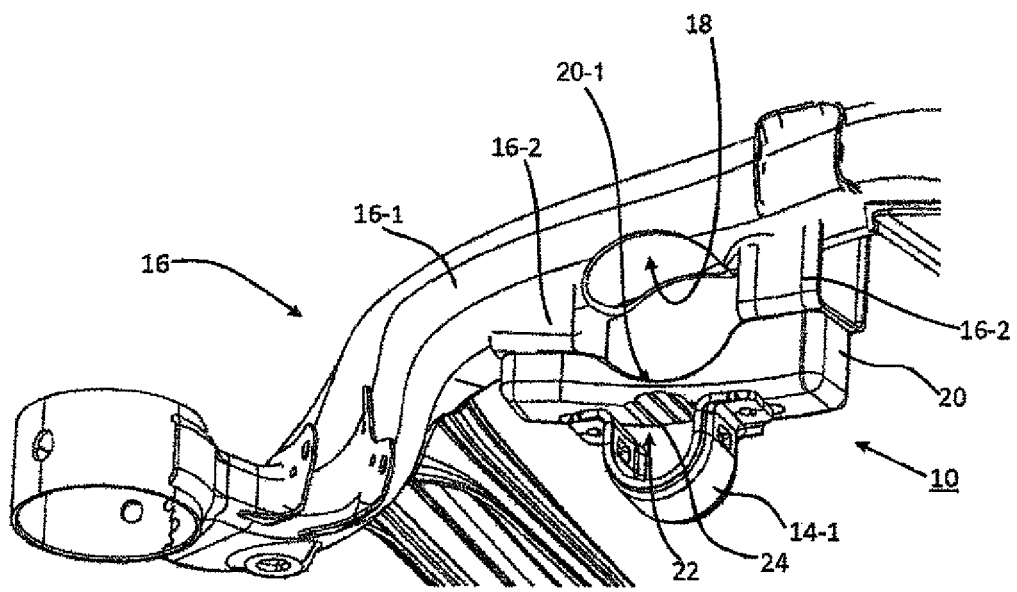
FIG. 2 is a three-dimensional illustration of the fastening arrangement of FIG. 1 without depiction of the unit mount and truncated depiction of the stabilizer mount.

FIG. 2 is a three-dimensional illustration of the fastening arrangement 10 without depiction of the unit mount and depiction of the stabilizer mount only by way of a stabilizer clamp 14-1. As is readily apparent from FIG. 2, the fastening arrangement 10 essentially includes a bearing seat 18, which is formed on a longitudinal member 16-1 of the subframe 16, and a fastening element 20, which is detachably connected to the longitudinal member 16-1. The bearing seat 18 is configured as a recess which is formed in the longitudinal member 16-1 and conforms to the outer contour of the unit mount 12. In addition, the longitudinal member 16-1 has brackets 16-2 formed thereto to ensure a simple and rapid securement of the fastening element 20.

The fastening element 20, which may be made of a fiber composite or also metal alloy is provided with a depression 20-1 on a side which faces the unit mount 12 so that the fastening element 20 is able to embrace the unit mount 12 in a clamp-like manner to thereby ensure that the unit mount 12 is held captive by a unit mount receptacle formed by the bearing seat 18 and the fastening element 20. Since bearings are normally of round configuration, the clamp-like enclosure ensures the presence of same amount of elastomer in radial direction and thus same damping action.

As is readily apparent from FIG. 2, the fastening element 20 also provides a fastening portion for the stabilizer clamp 14-1 of the stabilizer mount 14. For this purpose, the fastening element 20 is provided with a shaped portion 22 which is formed on a side facing the stabilizer mount 14 and has a configuration which corresponds to the outer contour of the stabilizer mount 14 or the elastomer of the stabilizer mount 14.

To prevent inadvertent radial turning of the elastomer body of the stabilizer mount 14, arranged in the stabilizer clamp 14-1, the shaped portion 22 is provided with grooves 24.

The fastening arrangement 10 according to the present invention has been shown as being especially beneficial in view of the sandwich-like or tiered disposition of the unit mount 12 and the stabilizer mount 14 that requires little space. Such a tiered configuration is also advantageous because the number of fastening portions to be formed on the subframe 16 is reduced.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A fastening arrangement for securing a unit mount and a stabilizer mount of a motor vehicle, said fastening arrangement comprising:
    an elongated vehicle component having a side extending transversely with respect to the longitudinal length of the vehicle component;
    a fastening element detachably connected to the vehicle component at said side of said vehicle component, said fastening element having one straight side facing away from the elongated vehicle component and provided with a first depression for supporting the stabilizer mount at the one straight side of said fastening element and an opposite side facing towards the elongated vehicle component and provided with a second depression for receiving the unit mount at a same longitudinal location,
    wherein the elongated vehicle component also has a concave bearing seat formed on said side of the vehicle component at the same longitudinal location and configured to receive the unit mount having a size and shape similar to the size and shape of said second depression, so that said unit mount is receivable in said second depression of said fastening element in proximity to the stabilizer mount but at a side of the fastening element opposite to the stabilizer mount, and the unit mount and the stabilizing mount can be arranged in alignment with each other in the transverse direction.

2. The fastening arrangement of claim 1, wherein the bearing seat is configured in the form of a recess formed in the vehicle component.

3. The fastening arrangement of claim 1, wherein the bearing seat is configured in the form of a bearing shell formed in the vehicle component.

4. The fastening arrangement of claim 1, wherein the bearing seat has a side in confronting relationship to the unit mount, said side being shaped in the form of a clamp.

5. The fastening arrangement of claim 1, wherein said first depression is formed as a shaped portion to conform to an outer contour of a portion of the stabilizer mount.

6. The fastening arrangement of claim 5, wherein the shaped portion has a surface area with grooves.

7. The fastening arrangement of claim 1, wherein the fastening element is made of a metal alloy or fiber composite.

8. The fastening arrangement of claim 1, wherein the fastening element is made of fiber-reinforced plastic.

9. The fastening arrangement of claim 1, further comprising a screw fastener to detachably connect the fastening element to a bracket of the vehicle component.

10. A motor vehicle, comprising:
    a unit mount;
    a stabilizer mount; and
    a fastening arrangement configured to secure the unit mount and the stabilizer mount, said fastening arrangement comprising an elongated vehicle component having a side extending transversely with respect to the longitudinal length of the vehicle component, a fastening element detachably connected to the vehicle component at said side of said vehicle component, said fastening element having one straight side facing away from the elongated vehicle component and provided with a first depression for supporting the stabilizer mount at the one straight side of said fastening element and an opposite side facing towards the elongated vehicle component and provided with a second depression for receiving the unit mount at the same longitudinal location, wherein the elongated vehicle component also has a concave bearing seat formed on said side of the vehicle component at the same longitudinal location and configured to receive the unit mount having a size and shape similar to the size and shape of said second depression, so that said unit mount is receivable in said second depression of said fastening element in proximity to the stabilizer mount but at a side of said fastening element opposite to the stabilizer mount, and the unit mount and the stabilizing mount can be arranged in alignment with each other in the transverse direction.

11. The motor vehicle of claim 10, wherein the vehicle component includes a bracket, said fastening arrangement including a screw fastener to detachably connect the fastening element to the bracket, the bracket and the vehicle structure forming a single-piece construction.

12. The motor vehicle of claim 10, wherein the bracket is a separate component which is connected to the vehicle component by an interference fit, or by a form fit, or by a material joint, or by a combination thereof.

13. The motor vehicle of claim 10, wherein the vehicle component is formed as a subframe.

14. The motor vehicle of claim 10, wherein the bearing seat is configured in the form of a recess formed in the vehicle component.

15. The motor vehicle of claim 10, wherein the bearing seat is configured in the form of a bearing shell formed in the vehicle component.

16. The motor vehicle of claim 10, wherein the bearing seat has a side in confronting relationship to the unit mount, said side being shaped in the form of a clamp.

17. The motor vehicle of claim 10, wherein said first depression is formed as a shaped portion to conform to an outer contour of a portion of the stabilizer mount.

18. The motor vehicle of claim 17, wherein the shaped portion has a surface area with grooves.

19. The motor vehicle of claim 10, wherein the fastening element is made of a metal alloy or fiber composite.

20. The motor vehicle of claim 10, wherein the fastening element is made of fiber-reinforced plastic.

* * * * *